(12) United States Patent
Gambetta

(10) Patent No.: US 9,653,997 B2
(45) Date of Patent: May 16, 2017

(54) RINGING SUPPRESSION METHOD AND APPARATUS FOR POWER CONVERTERS

(71) Applicant: Dialog Semiconductor (UK) Limited, Reading (GB)

(72) Inventor: Pietro Gabriele Gambetta, Munich (DE)

(73) Assignee: Dialog Semiconductor (UK) Limited, Reading (GB)

( * ) Notice: Subject to any disclaimer, the term of this patent is extended or adjusted under 35 U.S.C. 154(b) by 95 days.

(21) Appl. No.: 14/602,316

(22) Filed: Jan. 22, 2015

(65) Prior Publication Data

US 2016/0087530 A1 Mar. 24, 2016

(30) Foreign Application Priority Data

Sep. 24, 2014 (DE) .................... 10 2014 219 335

(51) Int. Cl.
*H02M 3/156* (2006.01)
*H02M 3/158* (2006.01)
*H02M 1/00* (2006.01)

(52) U.S. Cl.
CPC .......... *H02M 3/158* (2013.01); *H02M 3/156* (2013.01); *H02M 2001/0025* (2013.01); *H02M 2003/1566* (2013.01)

(58) Field of Classification Search
CPC . H02M 2003/1566; H02M 2001/0025; H02M 3/156
See application file for complete search history.

(56) References Cited

U.S. PATENT DOCUMENTS

| 5,917,719 | A | 6/1999 | Hoffman et al. | |
|---|---|---|---|---|
| 8,299,768 | B2 | 10/2012 | Satterfield et al. | |
| 2008/0197826 | A1* | 8/2008 | Schiff | H02M 3/156 323/282 |
| 2010/0001663 | A1* | 1/2010 | Wu | H05B 33/0815 315/308 |
| 2011/0127983 | A1* | 6/2011 | Peng | H02M 3/157 323/283 |
| 2015/0054474 | A1* | 2/2015 | Huang | G05F 1/625 323/234 |

FOREIGN PATENT DOCUMENTS

GB 10 2014 219 335.4 6/2015

* cited by examiner

*Primary Examiner* — Harry Behm
(74) *Attorney, Agent, or Firm* — Saile Ackerman LLC; Stephen B. Ackerman

(57) ABSTRACT

A method of controlling a power converter for converting a DC input voltage to a DC output voltage is presented The power converter comprises an inductor, one or more switching elements for energizing and de-energizing the inductor, a drive circuit for controlling switching operation of the one or more switching elements in accordance with a control signal, and a feedback circuit for generating the control signal on the basis of a first feedback quantity indicative of an actual output voltage of the power converter and in accordance with one or more circuit parameters of the feedback circuit, the method comprising: detecting an open loop condition of feedback control by the feedback circuit; and modifying at least one of the circuit parameters of the feedback circuit in such a manner that a time until the feedback control by the feedback circuit returns to the closed loop condition is reduced.

20 Claims, 8 Drawing Sheets

RINGING SUPPRESSION METHOD AND APPARATUS FOR POWER CONVERTERS

TECHNICAL FIELD

This application relates to a method and apparatus for ringing suppression in power converters. The method and apparatus are particularly applicable to DC-DC power converters, such as buck converters, in particular current-mode buck converters.

BACKGROUND

Power converters, such as DC-DC power converters that convert an input voltage to a typically lower output voltage are known in the art. In DC-DC power converters, the output voltage is typically controlled using a feedback loop (feedback circuit) in dependence on an actual value of the output voltage and/or an actual value of a coil current flowing through a coil of an output filter of the DC-DC power converter.

In such DC-DC power converters however, when a fast transient occurs at the output side of the DC-DC power converter, e.g. due to a sudden switch or change of the load (such as removal of the load, for example), the feedback loop might open, i.e. an open loop condition of the feedback control by the feedback loop might occur. This condition is due to the fact that the coil current is not capable of following the sudden change of the load since its current slew rate is limited by the inductivity of the coil via the well-known relationship dI/dt=V/L.

The open loop condition of the feedback loop may result in ringing (i.e. an unwanted oscillation of the output voltage and/or the load current) due to the step response of the output filter, which is not damped anymore by control of the feedback loop. Such ringing may cause damage to the components of the DC-DC power converter and should be avoided.

SUMMARY

There is a need for a method and apparatus capable of suppressing ringing in a power converter on occurrence of fast transients. In view of this problem, the present invention provides a method of controlling a power converter and an apparatus in a power converter having the features of the respective independent claims.

An aspect of the present invention relates to a method of controlling a power converter for converting a DC input voltage to a DC output voltage. The power converter may comprise an inductor, one or more switching elements for energizing and de-energizing the inductor, a drive circuit for controlling switching operation of the one or more switching elements in accordance with a control signal, and a feedback circuit for generating the control signal on the basis of a first feedback quantity indicative of an actual output voltage of the power converter and in accordance with one or more circuit parameters of the feedback circuit. The method may comprise detecting an open loop condition of feedback control by the feedback circuit. The method may further comprise modifying at least one of the circuit parameters of the feedback circuit in such a manner that a time until the feedback control by the feedback circuit returns to the closed loop condition is reduced. The power converter may generate the control signal on the basis of the first feedback quantity indicative of an actual output voltage of the power converter and an optional second feedback quantity indicative of an inductor current.

By detecting and countering an open loop condition as described above, ringing of the output voltage of the power converter upon occurrence of fast transients of the load and resulting damage to the elements of the power converter may be prevented.

The present document suggests a broad range of possibilities for detecting the open loop condition. In embodiments, detecting the open loop condition may involve comparing the first feedback quantity (e.g. the output voltage or a voltage proportional to the output voltage) to a first threshold value. Detecting the open loop condition may further involve determining that the open loop condition is present if the first feedback quantity exceeds the first threshold value. For example, the output voltage may be compared to an upper threshold voltage for the output voltage.

In embodiments, detecting the open loop condition may involve comparing the first feedback quantity to a second threshold value. Detecting the open loop condition may further involve determining that the open loop condition is present if the first feedback quantity does not exceed (i.e. drops below) the second threshold value. For example, the output voltage may be compared to a lower threshold voltage for the output voltage.

In embodiments, detecting the open loop condition may involve determining a gradient of the first feedback quantity. Detecting the open loop condition may further involve determining that the open loop condition is present if the determined gradient of the first feedback quantity is not within a predetermined range for the gradient of the first feedback quantity. Said predetermined range may comprise the zero value, and may be centered around the zero value, for example. In other words, it may be determined that the open loop condition is present if the absolute value of the slope of the output voltage becomes too large, i.e. if the actual output voltage rises or falls too steeply.

The feedback circuit may generate the control signal on the basis of a second feedback quantity indicative of an inductor current and a third feedback quantity indicative of a difference between the first feedback quantity and a reference voltage for the output voltage. Detecting the open loop condition may involve comparing the third feedback quantity to a voltage level corresponding to the second feedback quantity. Detecting the open loop condition may further involve determining that the open loop condition is present if a difference between the voltage level corresponding to the second feedback quantity and the third feedback quantity is different from zero for a full period of the switching operation of the switching elements.

By the above configurations, the open loop condition of feedback control by the feedback circuit may be detected reliably and with short delay. In addition, the risk of false alarms is minimized by the above configurations.

The present document also suggests a broad range of possibilities for modifying the at least one of the one or more circuit parameters of the feedback circuit. The feedback circuit may generate the control signal on the basis of the second feedback quantity and a third feedback quantity indicative of a difference between the first feedback quantity and a reference voltage for the output voltage, and the feedback circuit may comprise an operational amplifier element for generating the third feedback quantity by applying a gain factor to the difference between the first feedback quantity and the reference voltage for the output voltage. Modifying the at least one of the one or more circuit parameters may involves reducing the gain factor that is applied by the operational amplifier element in generating the third feedback quantity.

The feedback circuit may generate the control signal on the basis of the first feedback quantity and a fourth feedback quantity indicative of a sum of a fifth feedback quantity that is indicative of a result of a conversion of the second feedback quantity to a voltage value and a sixth feedback quantity that is indicative of a voltage output by a ramp generator. Modifying the at least one of the one or more control parameters may involve increasing a gain factor that is applied in the conversion of the second feedback quantity to the voltage value. Modifying the at least one of the one or more control parameters may involve decreasing a ramp slope of the ramp generator.

The feedback circuit may generate the control signal further on the basis of a seventh feedback quantity indicative of a difference between a current flowing through a switching element of the one or more switching elements and a reference current for the current flowing through said switching element. Modifying the at least one of the one or more control parameters may involve increasing the reference current for the current flowing through said switching element. For example, said switching element may be the switching element of the one or more switching elements that is arranged closest to ground.

The feedback circuit may generate the control signal further on the basis of an eighth feedback quantity indicative of a difference between a current flowing through a switching element of the one or more switching elements and a reference current for the current flowing through said switching element. Modifying the at least one of the one or more control parameters may involve decreasing the reference current for the current flowing through said switching element. For example, said switching element may be the switching element of the one or more switching elements that is arranged closest to the input voltage.

In embodiments, modifying the at least one of the one or more control parameters may involve adjusting a serial impedance and/or a parallel impedance of the feedback circuit in a manner that a transfer function of the feedback circuit after the adjustment has at least one additional pole and at least one additional zero.

In embodiments, modifying at least one of the one or more control parameters may be performed after the open loop condition of feedback control has been detected and the first feedback quantity has reached its peak value.

By the above configurations, once detected, the open loop condition may be countered efficiently and the power converter may be returned to the controlled state in short time. Since the proposed measures address components of the power converter that are already present, said measures may be implemented in a simple and cost-effective manner.

Another aspect relates to a control apparatus for a power converter for converting a DC input voltage to a DC output voltage. The power converter may comprise an inductor, one or more switching elements for energizing and de-energizing the inductor, a drive circuit for controlling switching operation of the one or more switching elements in accordance with a control signal, and a feedback circuit for generating the control signal on the basis of a first feedback quantity indicative of an actual output voltage of the power converter and in accordance with one or more circuit parameters of the feedback circuit. The control apparatus may comprise means for detecting an open loop condition of feedback control by the feedback circuit. The control apparatus may further comprise means for modifying at least one of the circuit parameters of the feedback circuit in such a manner that a time until the feedback control by the feedback circuit returns to the closed loop condition is reduced. The power converter may generate the control signal on the basis of the first feedback quantity indicative of an actual output voltage of the power converter and an optional second feedback quantity indicative of an inductor current.

In embodiments, the means for detecting the open loop condition may comprise means for comparing the first feedback quantity to a first threshold value. The means for detecting the open loop condition may further comprise means for determining that the open loop condition is present based on the result of the comparing means, e.g. if the first feedback quantity exceeds the first threshold value. In other words, the means for detecting the open loop condition may be configured to determine that the open loop condition is present if the first feedback quantity exceeds the first threshold value.

In embodiments, the means for detecting the open loop condition may comprise means for comparing the first feedback quantity to a second threshold value. The means for detecting the open loop condition may further comprise means for determining that the open loop condition is present based on the result of the comparing means, e.g. if the first feedback quantity does not exceed (i.e. drops below) the second threshold value. In other words, the means for detecting the open loop condition may be configured to determine that the open loop condition is present if the first feedback quantity does not exceed the second threshold value.

In embodiments, the means for detecting the open loop condition may comprise means for determining a gradient of the first feedback quantity. The means for detecting the open loop condition may further comprise means for determining that the open loop condition is present if the determined gradient of the first feedback quantity is not within a predetermined range for the gradient of the first feedback quantity. In other words, the means for detecting the open loop condition may be configured to determine that the open loop condition is present if the determined gradient of the first feedback quantity is not within the predetermined range for the gradient of the first feedback quantity. The predetermined range for the gradient of the first feedback quantity may comprise the zero gradient value and may be bounded by a positive upper threshold for the gradient and a negative lower threshold for the gradient. The predetermined range may be centered around the zero gradient value, for example.

The feedback circuit may generate the control signal on the basis of a second feedback quantity indicative of an inductor current and a third feedback quantity indicative of a difference between the first feedback quantity and a reference voltage for the output voltage. The means for detecting the open loop condition may comprise means for comparing the third feedback quantity to a voltage level corresponding to the second feedback quantity. The means for detecting the open loop condition may further comprise means for determining that the open loop condition is present if a difference between the voltage level corresponding to the second feedback quantity and the third feedback quantity is different from zero for a full period of the switching operation of the switching elements. In other words, the means for detecting the open loop condition may be configured to determine that the open loop condition is present if the difference between the voltage level corresponding to the second feedback quantity and the third feedback quantity is different from zero for a full period of the switching operation of the switching elements.

The feedback circuit may generate the control signal on the basis of the second feedback quantity and a third feedback quantity indicative of a difference between the first feedback quantity and a reference voltage for the output voltage, and the feedback circuit may comprise an operational amplifier element for generating the third feedback quantity by applying a gain factor to the difference between the first feedback quantity and the reference voltage for the output voltage. The means for modifying the at least one of the one or more circuit parameters may comprise means for reducing the gain factor that is applied by the operational amplifier element in generating the third feedback quantity. In other words, the means for modifying the at least one of the one or more circuit parameters may be configured to reduce the gain factor that is applied by the operational amplifier element in generating the third feedback quantity, i.e. to control the operational amplifier element to reduce said gain factor.

The feedback circuit may generate the control signal on the basis of the first feedback quantity and a fourth feedback quantity indicative of a sum of a fifth feedback quantity that is indicative of a result of a conversion of the second feedback quantity to a voltage value and a sixth feedback quantity that is indicative of a voltage output by a ramp generator. The means for modifying the at least one of the one or more circuit parameters may comprise means for increasing a gain factor that is applied in the conversion of the second feedback quantity to the voltage value. In other words, the means for modifying the at least one of the one or more circuit parameters may be configured to increase the gain factor that is applied in the conversion of the second feedback quantity to the voltage value, i.e. to perform a control operation to increase said gain factor. The means for modifying the at least one of the one or more circuit parameters may comprise means for decreasing a ramp slope of the ramp generator. In other words, the means for modifying the at least one of the one or more circuit parameters may be configured to decrease the ramp slope of the ramp generator, i.e. to control the ramp generator to decrease said ramp slope.

The feedback circuit may generate the control signal further on the basis of a seventh feedback quantity indicative of a difference between a current flowing through the switching element of the one or more switching elements that is arranged closest to ground and a reference current for the current flowing through said switching element. The means for modifying the at least one of the one or more circuit parameters may comprise means for increasing the reference current for the current flowing through said switching element. In other words, the means for modifying the at least one of the one or more circuit parameters may be configured to increase the reference current for the current flowing through said switching element.

The feedback circuit may generate the control signal further on the basis of an eighth feedback quantity indicative of a difference between a current flowing through the switching element of the one or more switching elements that is arranged closest to the input voltage and a reference current for the current flowing through said switching element. The means for modifying the at least one of the one or more circuit parameters may comprise means for decreasing the reference current for the current flowing through said switching element. In other words, the means for modifying the at least one of the one or more circuit parameters may be configured to decrease the reference current for the current flowing through said switching element.

In embodiments, the means for modifying the at least one of the one or more circuit parameters may comprise means for adjusting a serial impedance and/or a parallel impedance of the feedback circuit in a manner that a transfer function of the feedback circuit after the adjustment has at least one additional pole and at least one additional zero. In other words, the means for modifying the at least one of the one or more circuit parameters may be configured to adjust the serial impedance and/or the parallel impedance of the feedback circuit in a manner that the transfer function of the feedback circuit after the adjustment has at least one additional pole and at least one additional zero.

In embodiments, the means for modifying at least one of the one or more circuit parameters may be configured to modify at least one of the one or more control parameters after the open loop condition of feedback control has been detected and the first feedback quantity has reached its peak value.

Another aspect relates to a power converter comprising the control apparatus according to the preceding aspect.

It will be appreciated that the method steps and apparatus features may be interchanged in many ways. In particular, the details of the disclosed apparatus can be implemented as a method, and the disclosed method steps implemented as apparatus features, as the skilled person will appreciate.

BRIEF DESCRIPTION OF THE DRAWINGS

The invention is explained below in an exemplary manner with reference to the accompanying drawings, wherein FIG. 1 schematically shows a circuit diagram of a power converter to which embodiments of the invention may be applied.

DESCRIPTION

Figure 1:
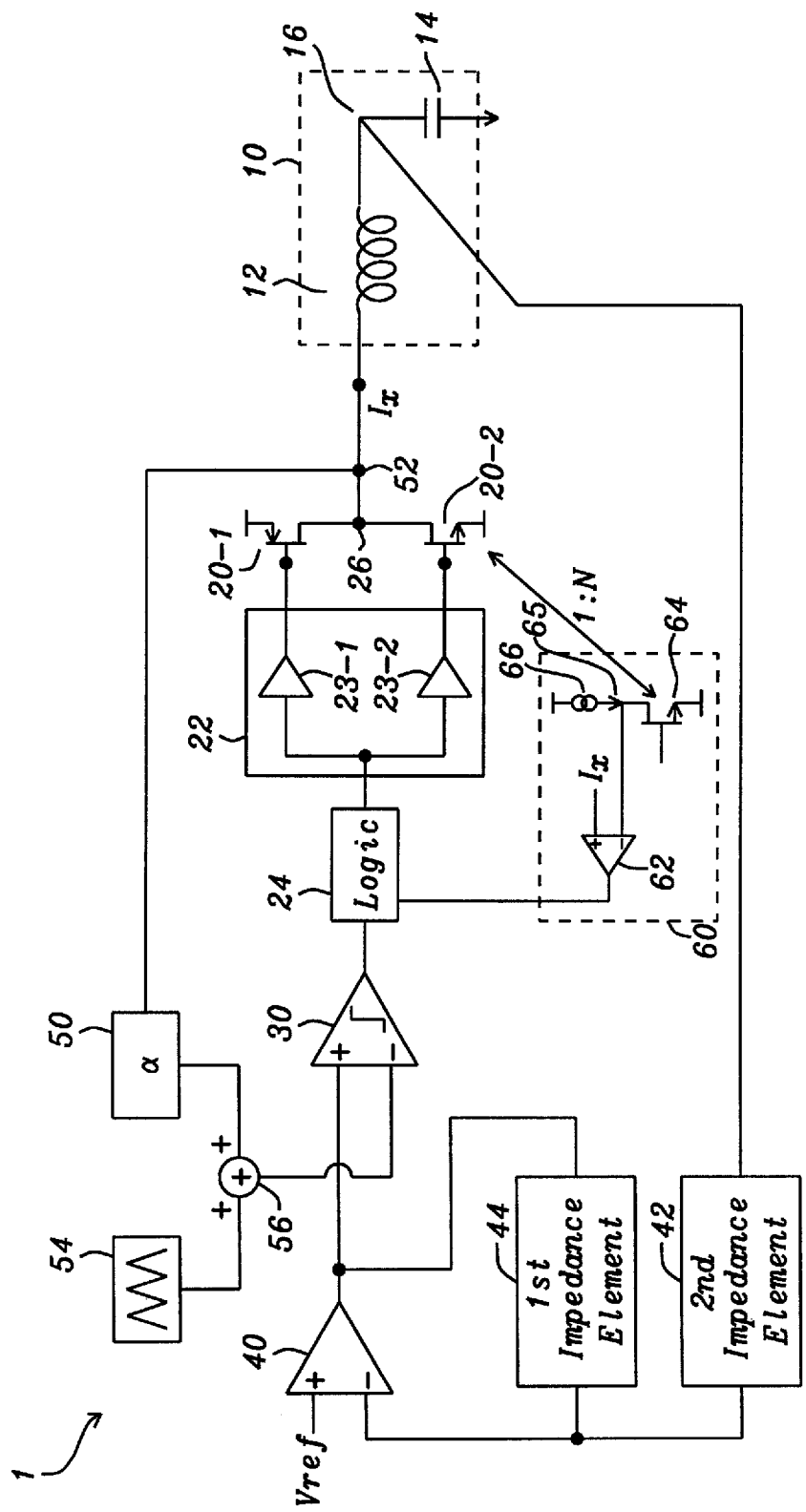

FIG. 1 schematically illustrates a circuit diagram of a power converter 1 to which embodiments of the invention may be applied. The power converter 1 is a DC-DC power converter. Particular examples of the power converter 1 relate to a buck converter, and to a current-mode buck converter, but the power converter 1 is not limited to these examples.

The power converter 1 comprises an inductor 12 (e.g. a coil unit) and one or more switching elements 20-1, 20-2 (e.g. MOSFETs) for energizing and de-energizing the inductor 12. A drive circuit 22 controls the switching operation of the one or more switching elements 20-1, 20-2 in accordance with a control signal. A feedback circuit generates the control signal on the basis of a first feedback quantity indicative of an actual output voltage of the power converter 1 and a second feedback quantity indicative of an inductor current flowing through the inductor 12. The feedback circuit further generates the control signal in accordance with one or more circuit parameters of the feedback circuit. Examples of such circuit parameters will be described below.

The inductor 12 is provided at an output side of the power converter 1 and is part of an output filter 10. The output filter 10 further comprises a capacitor (capacitor element) 14, one end of which is grounded, and in parallel to which a load to the power converter 1 may be connected.

The power converter 1 further comprises the drive circuit 22 which comprises one or more driver units 23-1, 23-2, the number of which is equal to the number of switching elements 20-1, 20-2. Each driver unit 23-1, 23-2 corresponds to a respective one of the switching elements 20-1, 20-2. A control circuit 24 of the feedback circuit controls the drive circuit 22 (or more specifically, the driver units 23-1, 23-2 of the drive circuit 22) by means of the control signal. The one or more switching elements 20-1, 20-2 are connected in series between a terminal to which the input voltage (e.g. a battery voltage) is supplied, and ground. The inductor 12 is connected to an intermediate node 26 between the switching element 20-1 arranged closest to the terminal to which the input voltage is supplied, and the switching element 20-2 arranged closest to ground.

The power converter 1 further comprises a first comparator (PWM comparator) 30. The first comparator 30 may be an operational amplifier, for example. The first comparator 30 generates an output signal on the basis of the first feedback quantity and the second feedback quantity. An output port of the first comparator 30 is connected to an input port of the control circuit 24, so that the generated output signal is fed to the control circuit 24. The first comparator 30 and the control circuit 24 are parts of the feedback circuit.

The control circuit 24 generates the control signal on the basis of the output signal of the first comparator 30 and optionally on the basis of a seventh feedback quantity and/or an eighth feedback quantity that may be fed to the control circuit 24. Therein, the seventh feedback quantity depends on (is indicative of) a difference between a current flowing through the switching element 20-2 arranged closest to ground and a reference current for said current (negative current limit, or negative current threshold). The eighth feedback quantity depends on (is indicative of) a difference between a current flowing through the switching element 20-1 arranged closest to the terminal to which the input voltage is supplied and a reference current for said current (positive current limit, or positive current threshold).

The first feedback quantity is obtained by tapping a voltage (feedback voltage) at feedback voltage node 16 arranged at the output side of the power converter 1, e.g. at an output node between the inductor 12 and the capacitor 14. The second feedback quantity is obtained by tapping a current (feedback current) at a current feedback node 52, e.g. between the inductor 12 and the intermediate node 26. Alternatively, the current may be tapped at a node between the switching element 20-1 arranged closest to the terminal to which the input voltage is supplied and said terminal, or at a node between the switching element 20-2 arranged closest to ground and ground.

The voltage feedback node 16 is connected to a first input port of a second comparator (error amplifier) 40. The error amplifier may be an operational amplifier, for example. A reference voltage $V_{ref}$ that is chosen in accordance with a desired output voltage, i.e. a reference voltage for the output voltage, is fed to the other, i.e. second, input port of the error amplifier 40. The error amplifier 40 compares the feedback voltage (i.e. the first feedback quantity) to the reference voltage and outputs a third feedback quantity (error voltage) that depends on (i.e. is indicative of) a difference between the feedback voltage and the reference voltage. In generating the third feedback quantity, the error amplifier 40 may apply a gain to the difference between the feedback voltage and the reference voltage. Said gain may be a variable gain. An output port of the error amplifier 40 is connected to a first input port of the first comparator 30, so that the third feedback quantity is fed to the first input port of the first comparator 30. Given this configuration, it can be said that the feedback circuit generates the control signal on the basis of the second feedback quantity and the third feedback quantity, wherein the third feedback quantity in turn depends on the first feedback quantity. The error amplifier 40 is a part of the feedback circuit.

Optionally, a first impedance element 42 may be connected in series between the voltage feedback node 16 and the first input port of the error amplifier 40, and/or a second impedance element 44 may be connected in parallel to the error amplifier 40, between the output port and the first input port. The first and/or second impedance elements 42, 44 may be variable impedance elements, i.e. their impedance values may be variable. The first and/or second impedance elements 42, 44 may be variable resistors, for example.

The power converter 1 further comprises a converter (current converter) 50 and optionally a ramp generator 54 and an adder 56. An input port of the current converter 50 is connected to the current feedback node 52. An output port of the adder 56 is connected to the other, i.e. second, port of the first comparator 30 so that a fourth feedback quantity output by the adder 56 is fed to the second port of the first comparator 30.

The current converter 50 converts the feedback current (i.e. the second feedback quantity) to a fifth feedback quantity that depends on (is indicative of) a voltage value corresponding to the feedback current, wherein the current converter 50 may apply a variable conversion factor (gain factor, current sensing gain α) between the feedback current and the voltage value. Accordingly, the fifth feedback quantity is indicative of a result of a conversion of the second feedback quantity to a voltage value. The ramp generator 54 outputs, as a sixth feedback quantity, a voltage (ramp voltage) that repeatedly rises in accordance with a positive ramp slope until a given upper ramp voltage level is reached and subsequently falls in accordance with a negative ramp slope until a given lower ramp voltage level is reached. That is, the sixth feedback quantity is indicative of a voltage output by the ramp generator 54. Any of the positive ramp slope, the negative ramp slope, the upper ramp voltage level and the lower ramp voltage level may be variable. The positive and negative ramp slopes may be commonly referred to as ramp slopes in the following. In embodiments of the invention, the ramp voltage may be generated so as to set a PWM gain of the power converter 1 and/or to compensate a sub-harmonic instability of the power converter 1. In an example, the PWM gain is approximately given by the input voltage times the frequency of the switching operation, divided by the ramp slope. In embodiments, for compensation of sub-harmonic instability, the positive ramp slope may be at least half the maximum current slew rate of the inductor 12.

An output port of the current converter 50 and an output port of the ramp generator 54 are connected to input port of the adder 56. The adder 56 adds the fifth feedback quantity and the sixth feedback quantity to obtain the above-mentioned fourth feedback quantity. In the absence of the ramp generator 54 and the adder 56, the fifth feedback quantity is directly fed to the second port of the first comparator 30.

Given this configuration, it can be said that the feedback circuit generates the control signal on the basis of the first feedback quantity and the fourth feedback quantity, wherein the fourth feedback quantity in turn depends on the second feedback quantity via the fifth feedback quantity. The fourth feedback quantity further depends on the sixth feedback quantity.

As indicated above, the control circuit 24 may generate the control signal optionally on the basis of the seventh feedback quantity and/or the eighth feedback quantity. Accordingly, the power converter 1 may comprise a first current comparison circuit 60 for generating the seventh feedback quantity and/or a second current comparison circuit (not shown) for generating the eighth feedback quantity.

The first current comparison circuit 60 comprises a comparator 62 (e.g. an operational amplifier), a transistor element 64 (e.g. a MOSFET), and a current source 66 that outputs a reference current. The current source 66 is connected between a positive voltage and the drain terminal of the transistor element 64, while the source terminal of the transistor element 64 is connected to ground. The transistor element 64 is connected to the switching element 20-2 arranged closest to ground, so as to form a current mirror with said switching element 20-2, wherein the current mirror is configured so that the current flowing through the transistor element 64 is a given fraction (e.g. 1/N, N being an integer, for example) of the current flowing through said switching element 20-2. A voltage at a node 65 between the current source 66 and the drain terminal of the transistor element 64 is fed to the comparator 62. Further, a reference voltage depending on a reference value for a current flowing through the switching element 20-2 arranged closest to ground is also fed to the comparator 62. The comparator 62 outputs the seventh feedback quantity depending on a difference between said reference voltage and the voltage at the node 65 between the current source 66 and the drain terminal of the transistor element 64. Thus, the seventh feedback quantity depends on (is indicative of) the difference between the current flowing through the switching element 20-2 arranged closest to ground and the reference current for said current (i.e. the negative current threshold). The output port of the comparator 62 is connected to the control circuit 24, so that the seventh feedback quantity may be fed to the control circuit 24. In other words, the voltage drop across the switching element 20-2 arranged closest to ground is indirectly compared to the reference voltage by comparing a scaled version of said voltage drop to the reference voltage.

The second current comparison circuit (not shown) is identical in configuration to the first current comparison circuit 60, with the exception that now the transistor element of the second current comparison circuit is connected to the switching element 20-1 arranged closest to the terminal to which the input voltage is supplied, and that now a reference voltage depending on a reference value for a current flowing through the switching element 20-1 arranged closest to the terminal to which the input voltage is supplied is fed to the comparator of the second current comparison circuit. The comparator of the second current comparison circuit outputs the eighth feedback quantity depending on a difference between said reference voltage and the voltage at a node between a current source and the drain terminal of a transistor element of the second current comparison circuit. Thus, the eight feedback quantity depends on (is indicative of) the difference between the current flowing through the switching element 20-1 arranged closest to the terminal to which the input voltage is supplied and the reference current for said current (i.e. the positive current threshold). The output port of the comparator of the second current comparison circuit is connected to the control circuit 24, so that the eighth feedback quantity may be fed to the control circuit 24.

As indicated above, the control circuit 24 and the first comparators 30, as well as the error amplifier 40 are parts of the feedback circuit. The feedback circuit further comprises, if present in the power converter 1, the current converter 50, the ramp generator 54, the adder 56, the first and second impedance elements 42, 44, the first current comparison circuit 60, and the second current comparison circuit.

As mentioned above, the feedback circuit can be said to generate the control signal on the basis of the first feedback quantity and the second feedback quantity, and in accordance with the one or more circuit parameters of the feedback circuit. Further, depending on the configuration of the power converter 1, the feedback circuit can be said to generate the control signal on the basis of the second feedback quantity and the third feedback quantity, on the basis of the first feedback quantity and the fourth feedback quantity, or on the basis of the third feedback quantity and the fourth feedback quantity, and in accordance with the one or more circuit parameters of the feedback circuit, respectively. Optionally, the control circuit 24 can be said to generate the control signal, in addition to the respective above feedback quantities, on the basis of the seventh feedback quantity and/or the eight feedback quantity.

According to the invention, a method of controlling the power converter 1 comprises detecting an open loop condition of feedback control by the feedback circuit, and modifying at least one of the circuit parameters of the feedback circuit in such a manner that a time until is reduced that the feedback control needs to return the control to the closed loop condition, i.e. in such a manner that ringing is suppressed (damped). It is understood that said modifying the at least one of the circuit parameters of the feedback circuit may be performed responsive to detection of the open loop condition, with or without delay with respect to said detection.

Correspondingly, a control apparatus for use in the power converter 1 comprises means for detecting the open loop condition of feedback control by the feedback circuit, and means for modifying at least one of the circuit parameters of the feedback circuit in such a manner that the time until the feedback control by the feedback circuit returns to the closed loop condition is reduced.

Detection of the open loop condition of the feedback circuit may be based on the first feedback quantity (feedback voltage, e.g. the actual output voltage of the power converter 1) and/or the second feedback quantity (feedback current, e.g. the current flowing through the inductor 12). In the following, examples of methods and means for detecting the open loop condition of the feedback circuit will be described. It is to be understood that the described methods and means may be employed individually, or in any combination thereof. That is, any one, any two, or any three of the described methods and means may be employed at a time.

According to a first method for detecting the open loop condition of the feedback circuit, the first feedback quantity (feedback voltage, e.g. the output voltage) is compared to a first threshold value, which is an upper threshold for the output voltage. If the feedback voltage is found to exceed the first threshold value, it is determined that that the open loop condition is present.

Correspondingly, the means for detecting the open loop condition of the control apparatus may comprise means for comparing the first feedback quantity (feedback voltage) to the first threshold value, such as a comparator or an operational amplifier, for example, and means for determining whether or not the feedback voltage exceeds the first threshold value, such as a logic circuit, for example.

According to a variation of the first method for detecting the open loop condition of the feedback circuit, the first feedback quantity (feedback voltage) is compared to a second threshold value, which is a lower threshold for the output voltage. If the feedback voltage is found to not exceed the second threshold value, it is determined that that the open loop condition is present. It is to be understood that the first method for detecting the open loop condition and the variation thereof may be employed simultaneously (i.e. in parallel). Needless to say, it is understood that the first threshold value is larger than the second threshold value.

Correspondingly, the means for detecting the open loop condition of the control apparatus may comprise means for comparing the first feedback quantity (feedback voltage) to the second threshold value, such as a comparator, or an operational amplifier, for example, and means for determining whether or not the feedback voltage does not exceed the second threshold value, such as a logic circuit, for example.

In general, it can be said that the first method and variation thereof relate to determining whether or not the feedback voltage is within a predetermined range for the feedback voltage. If the feedback voltage is not within said predetermined range, it is determined that the open loop condition is present.

Figure 2:
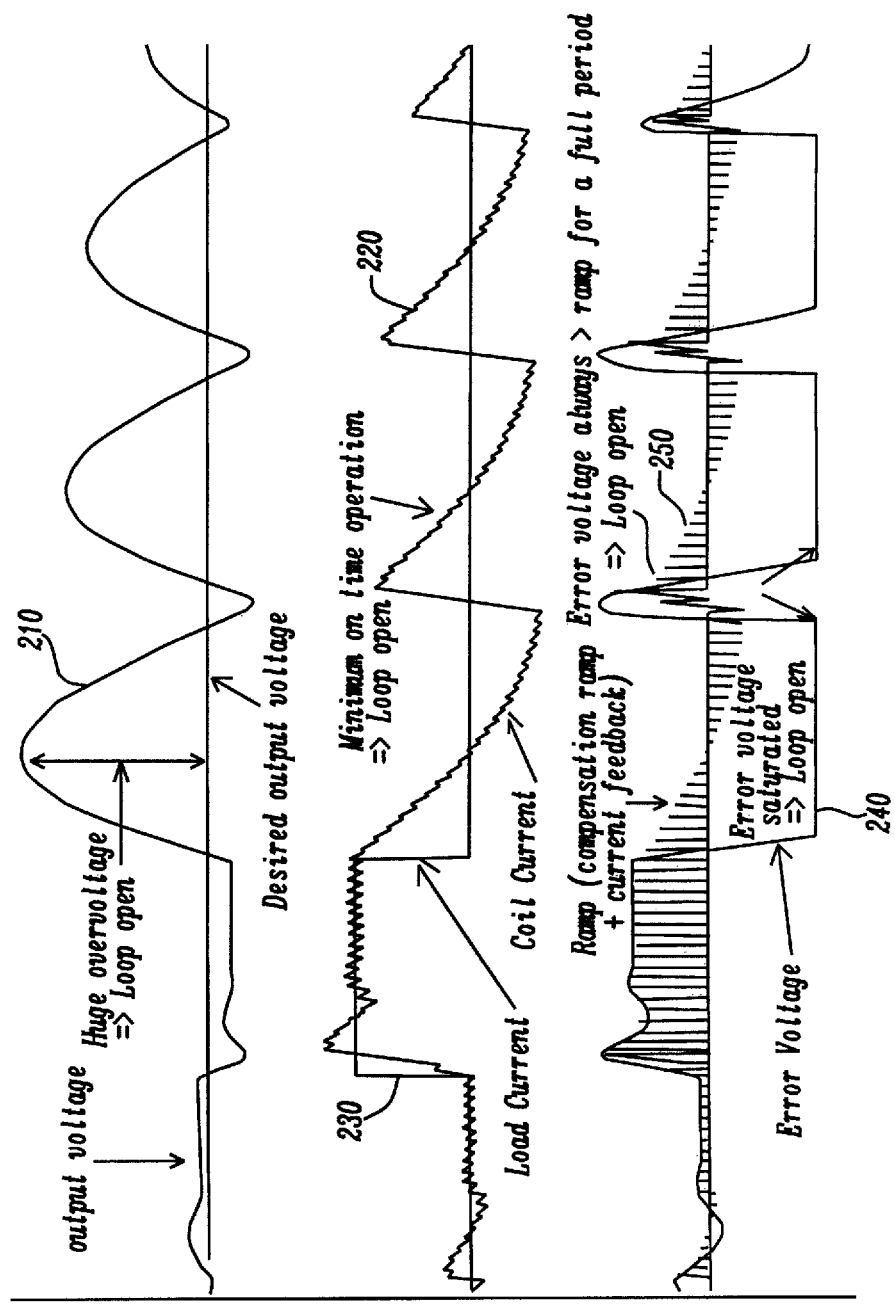
FIG. 2 shows graphs illustrating an output voltage and a coil current of the power converter in case of a removal of the load from the power converter.

FIG. 2 shows graphs illustrating, in the upper panel, the actual output voltage (first feedback quantity, curve 210) and, in the middle panel, the actual coil current (second feedback quantity curve 220) and the load current (curve 230) as well as, in the lower panel, the error current (third feedback quantity, curve 240) and the ramp (fourth feedback quantity, curve 250) in case of sudden removal of the load from the power converter 1. It should be noted that the graphs of FIG. 2 relate to the open loop condition of feedback control by the feedback circuit, and illustrate a case to which the present invention could be advantageously applied. At the time of removal of the load (approximately at 20 μs, see the lighter curve in the middle panel), the actual output voltage starts to oscillate with high amplitude and only relatively small damping. Likewise, the actual coil current initially starts to decrease in accordance with the laws of inductivity, and then starts to increase steeply at the first negative peak of the actual output voltage, and so forth. As can be seen from the upper panel of FIG. 2, the open loop condition may be detected by comparing the actual output voltage to appropriately chosen upper and/or lower thresholds for the output voltage so that appropriate counter measures can be applied in a timely fashion.

According to a second method for detecting the open loop condition of the feedback circuit, a gradient of the first feedback quantity (feedback voltage, e.g. the actual output voltage of the power converter 1) is determined. If the determined gradient of the first feedback quantity is found to be not within a predetermined range for the gradient of the first feedback quantity, it is determined that the open loop condition is present. The predetermined range for the gradient of the first feedback quantity may comprise the zero gradient value and may be bounded by a positive upper threshold for the gradient and a negative lower threshold for the gradient. The predetermined range may be centered around the zero gradient value, for example. Put differently, the second method for detecting the open loop condition determines whether the absolute value of the slope of the actual output voltage of the power converter 1 becomes too large, i.e. whether or not the actual output voltage rises or falls too steeply.

Figure 3:
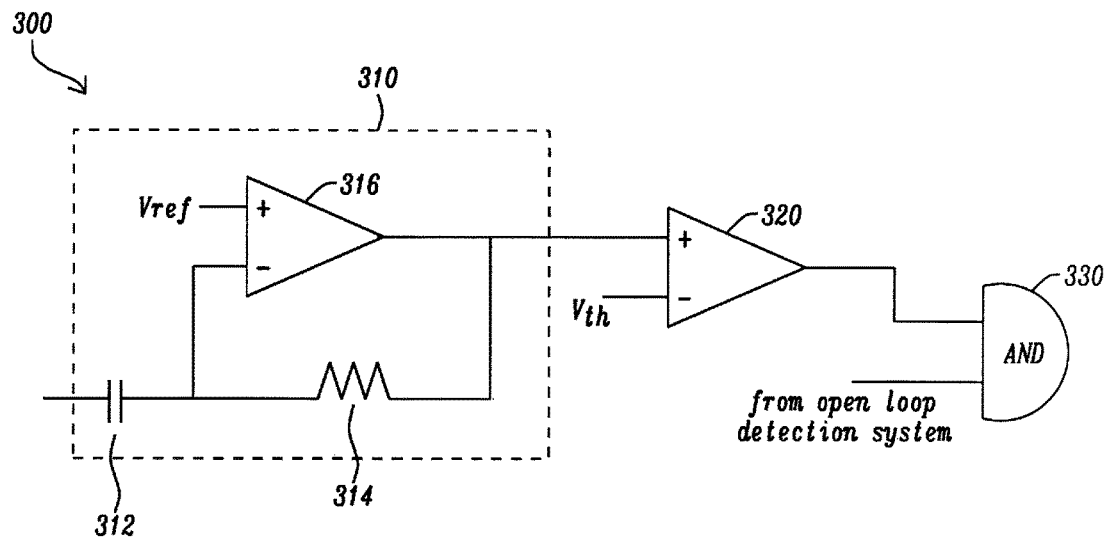
FIG. 3 schematically shows a circuit diagram of a circuit for detecting a gradient or peak of the output voltage according to embodiments of the invention.

Correspondingly, the means for detecting the open loop condition of the control apparatus may comprise means for determining the gradient of the first feedback quantity, such as a derivator circuit, for example, and means for determining that the open loop condition is present if the determined gradient of the first feedback quantity is not within a predetermined range for the gradient of the first feedback quantity. The latter means may comprise means for determining whether or not the gradient is within the predetermined range for the gradient of the first feedback quantity, e.g. a pair of comparators that compare the gradient to the upper and lower thresholds for the gradient, and a logic circuit, for example. An example of a circuit for determining the gradient of the actual output voltage (derivator circuit) that is applicable in the present context is illustrated in FIG. 3 and will be described later.

As can be seen from the upper panel of FIG. 2, the actual output voltage of the power converter 1, when oscillating with high amplitude and only relatively small damping, has portions of steep increase and steep decrease. Accordingly, the open loop condition may be detected by comparing the gradient of the actual output voltage to appropriately chosen upper and/or lower thresholds for said gradient, i.e. by determining whether the gradient is within an appropriately chosen range for the gradient.

For a third method for detecting the open loop condition of the feedback circuit, it is assumed that the feedback circuit generates the control signal on the basis of the second feedback quantity (feedback current, e.g. the current flowing through the inductor 12) and the third feedback quantity (error voltage) indicative of the difference between the first feedback quantity and the reference voltage for the output voltage. According to the third method for detecting the open loop condition of the feedback circuit, the third feedback quantity is compared to a voltage value corresponding to the second feedback quantity (such as the fourth feedback quantity or the fifth feedback quantity, for example). If a difference between the voltage value corresponding to the second feedback quantity and the third feedback quantity is different from zero (and does not flip its sign) for a full period of the switching operation of the one or more switching elements 20-1, 20-2, it is determined that the open loop condition is present. For instance, when the feedback circuit generates the control signal on the basis of the third feedback quantity and the fourth feedback quantity, the third feedback quantity may be compared to the fourth feedback quantity. If a difference between the fourth feedback quantity and the third feedback quantity is different from zero (and does not flip its sign) for a full period of the switching operation of the one or more switching elements 20-1, 20-2, it may be determined that the open loop condition is present. In other words, it is determined that the open loop condition is present if the error voltage does not cross the signal resulting from the coil current and the voltage output by the ramp generator 54 during a full period of the switching operation.

Correspondingly, the means for detecting the open loop condition of the control apparatus may comprise means for comparing the voltage value corresponding to the second feedback quantity to the third feedback quantity, such as a comparator, for example, and means for determining that the difference between the voltage value corresponding to the second feedback quantity and the third feedback quantity is different from zero (and does not flip its sign) for a full period of the switching operation. Further, the means for detecting the open loop condition of the control apparatus may comprise means for comparing the fourth feedback quantity to the third feedback quantity, such as a comparator, for example, and means for determining that the difference between the fourth feedback quantity and the third feedback quantity is different from zero (and does not flip its sign) for a full period of the switching operation.

Next, examples of methods and means for modifying the at least one of the circuit parameters of the feedback circuit will be described. It is to be understood that the described methods and means may be employed individually, or in any combination. That is, any one, any two, or any three, any four, or any five of the described methods and means may be employed at a time.

For a first method for modifying the at least one of the circuit parameters of the feedback circuit, it is assumed that the feedback circuit generates the control signal on the basis of the second feedback quantity (feedback current, e.g. the current flowing through the inductor 12) and the third feedback quantity (error voltage) indicative of a difference between the first feedback quantity (feedback voltage) and the reference voltage for the output voltage, and the feedback circuit comprises the error amplifier 40 (an operational amplifier element) for generating the third feedback quantity by applying a gain factor to the difference between the first feedback quantity and the reference voltage for the output voltage. According to a first method for modifying the at least one of the circuit parameters of the feedback circuit, the gain factor that is applied by the operational amplifier element in generating the third feedback quantity is reduced. The gain factor may be reduced by a predetermined amount. It is to be noted that the gain factor that is applied by the operational amplifier element is an example of a circuit parameter of the feedback circuit.

Correspondingly, the means for modifying at least one of the circuit parameters of the feedback circuit of the control apparatus may comprise means for reducing the gain factor that is applied by the error amplifier 40 (operational amplifier element) in generating the third feedback quantity.

Figure 4:
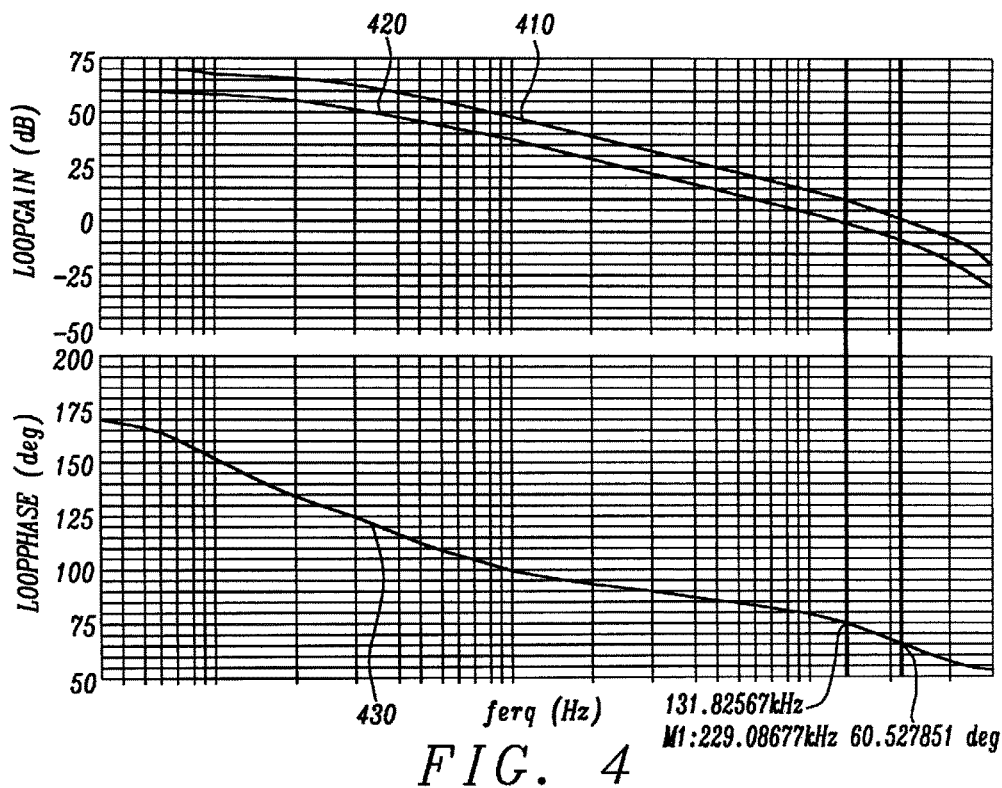
FIG. 4 shows a resulting frequency response of a feedback circuit of the power converter when applying embodiments of the invention.

FIG. 4 shows the resulting frequency response of the feedback circuit in case of a reduction of the gain of the error amplifier 40. In FIG. 4, and likewise in FIG. 5 to FIG. 8, the upper panel indicates the gain of the frequency response of the feedback circuit (feedback loop), while the lower panel indicates the phase of the frequency response. As can be seen from the upper panel, in which the upper curve 410 indicates the gain of the frequency response before reduction of the error amplifier gain and the lower curve 420 indicates the gain of the frequency response after reduction of the error amplifier gain, the gain of the frequency response is reduced upon reduction of the gain of the error amplifier 40 (error amplifier gain). As can be seen from the coinciding curves 430 in the lower panel, which indicate the phase of the frequency response before and after reduction of the error amplifier gain, the phase is unchanged. Accordingly, the bandwidth of the feedback loop is decreased, and the phase margin is increased.

In addition, the dynamic range of the third feedback quantity (error voltage) is decreased by decreasing the error amplifier gain, which may ensure an earlier crossing of the voltage value corresponding to the second feedback quantity (e.g. the fourth feedback quantity or the fifth feedback quantity) and the error voltage.

The error amplifier gain may be modified by changing the impedance values of the first and second impedance elements 42, 44 of FIG. 1. For impedance values of the first and second impedance elements 42, 44 of $Z_1$ and $Z_2$, respectively, the error amplifier gain is given by $1+Z_2/Z_1$. Thus, the error amplifier gain may be reduced by reducing (the absolute value of) $Z_2$ and/or by increasing (the absolute value of) $Z_1$.

For a second method for modifying the at least one of the circuit parameters of the feedback circuit it is assumed that the feedback circuit generates the control signal on the basis of the first feedback quantity (feedback voltage, e.g. the actual output voltage of the power converter 1) and the fourth feedback quantity indicative of the sum of the fifth feedback quantity which is indicative of the result of the conversion of the second feedback quantity (feedback current, e.g. the current flowing through the inductor 12) to a voltage value and the sixth feedback quantity which is indicative of the voltage output by the ramp generator 54. According to the second method for modifying the at least one of the circuit parameters of the feedback circuit, a gain factor (current feedback, current sensing gain α) that is applied in the conversion of the second feedback quantity to the voltage value is increased. It is to be noted that the gain factor that is applied in the conversion of the second feedback quantity to the voltage value by the current converter 50 is another example of a circuit parameter of the feedback circuit.

Correspondingly, the means for modifying at least one of the circuit parameters of the feedback circuit of the control apparatus may comprise means for increasing the gain factor that is applied in the conversion of the second feedback quantity to the voltage value.

Figure 5:
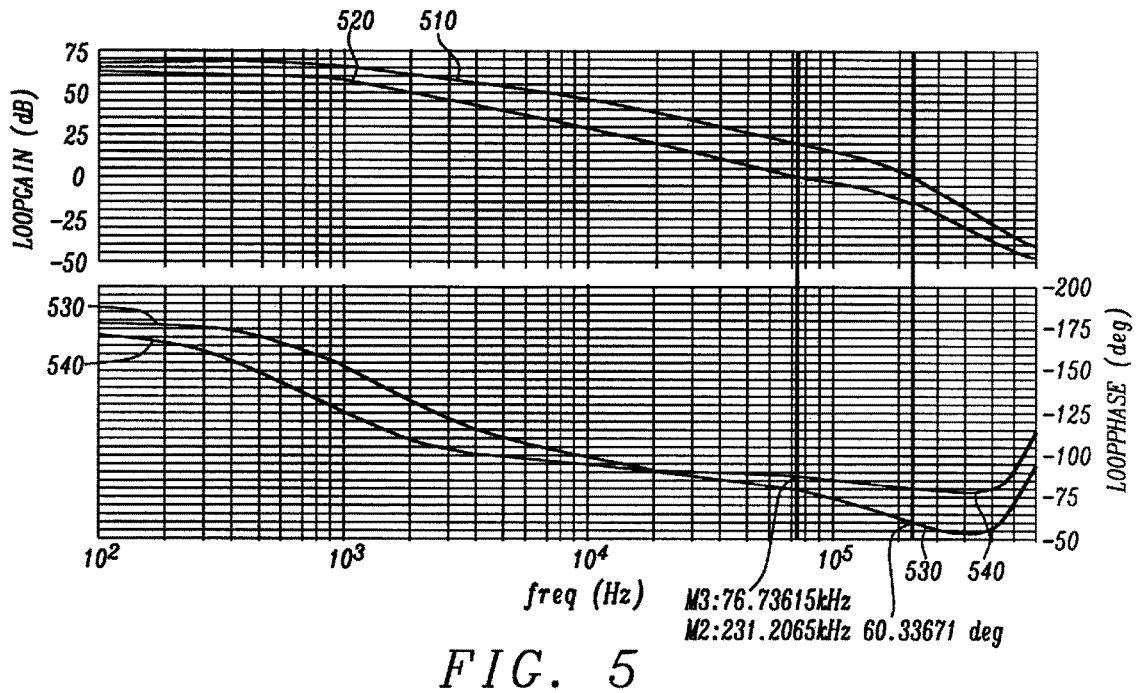
FIG. 5 shows a resulting frequency response of the feedback circuit of the power converter when applying embodiments of the invention.

FIG. 5 shows the resulting frequency response of the feedback circuit in case of an increase of the gain factor that is applied in the conversion of the second feedback quantity to the voltage value. As can be seen from the upper panel, in which the upper curve 510 indicates the gain of the frequency response after increase of the current sensing gain α and the lower curve 520 indicates the gain of the frequency response before increase of the current sensing gain α, the gain of the frequency response is increased upon increase of the current sensing gain α. As can be seen from the lower panel, in which the upper curve 530 (i.e. the upper curve for low frequencies) indicates the phase of the frequency response before increase of the current sensing gain α and the lower curve 540 (i.e. the lower curve for low frequencies) indicates the phase of the frequency response after increase of the current sensing gain α, the phase of the frequency response is decreased for frequencies below a frequency threshold (between $10^4$ Hz and $10^5$ Hz in the figure) and increased for frequencies above the frequency threshold, upon an increase of the current sensing gain α. Accordingly, the phase margin of the main loop is increased, and the poles of the output filter are further split by the increase of the current sensing gain α.

In addition, the dynamic range of the voltage value corresponding to the second feedback quantity (e.g. the fourth feedback quantity or the fifth feedback quantity) is increased by increasing the current sensing gain α, which may ensure an earlier crossing of the voltage value corresponding to the second feedback quantity (e.g. the fourth feedback quantity or the fifth feedback quantity) and the error voltage.

For a third method for modifying the at least one of the circuit parameters of the feedback circuit, it is assumed that the feedback circuit generates the control signal on the basis of the first feedback quantity (feedback voltage, e.g. the actual output voltage of the power converter 1) and the fourth feedback quantity which is indicative of a sum of the fifth feedback quantity indicative of a result of a conversion of the second feedback quantity (feedback current, e.g. the current flowing through the inductor 12) to a voltage value and the sixth feedback quantity indicative of a voltage output by the ramp generator 54. According to the third method for modifying the at least one of the circuit parameters of the feedback circuit, a ramp slope of the ramp generator 54 is decreased. Said decrease may relate to the positive ramp slope and/or the negative ramp slope. It is to be noted that the ramp slope of the ramp generator 54 (positive ramp slope or negative ramp slope) is another example of a circuit parameter of the feedback circuit.

Correspondingly, the means for modifying at least one of the circuit parameters of the feedback circuit of the control apparatus may comprise means for decreasing the ramp slope (e.g. the positive ramp slope) of the ramp generator 54.

Figure 6:
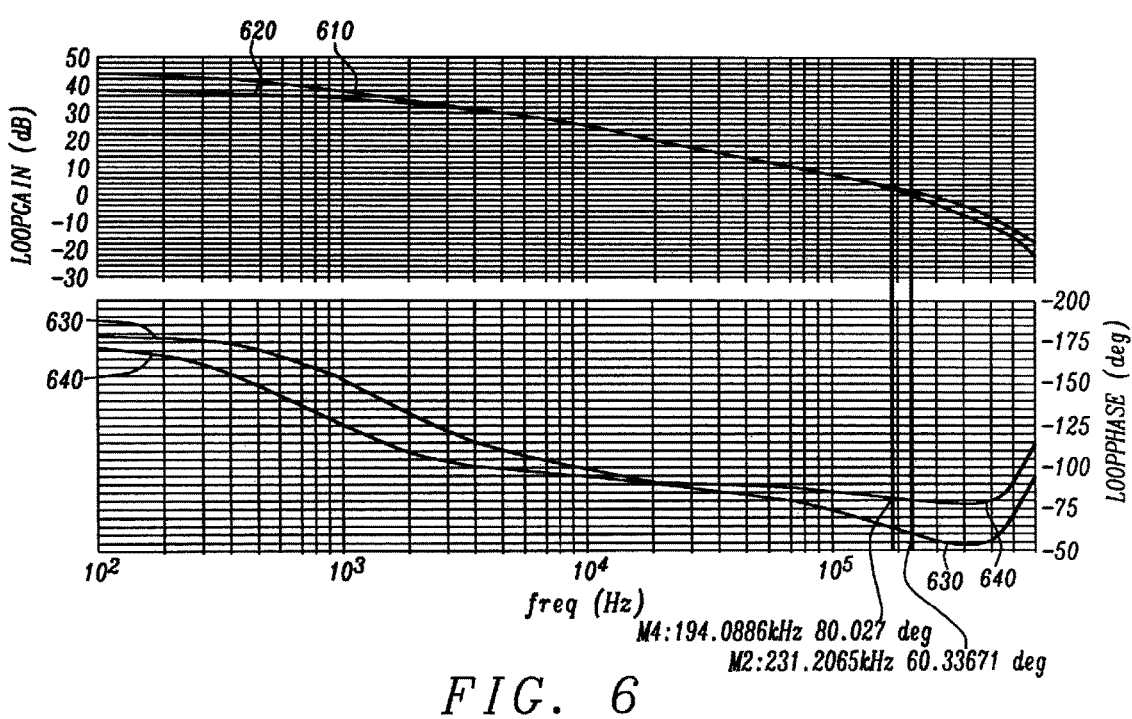
FIG. 6 shows a resulting frequency response of the feedback circuit of the power converter when applying embodiments of the invention.

FIG. 6 shows the resulting frequency response of the feedback circuit in case of a decrease of the positive ramp slope of the ramp generator 54. As can be seen from the upper panel, in which the upper curve 610 indicates the gain of the frequency response before decrease of the positive ramp slope and the lower curve 620 indicates the gain of the frequency response after decrease of the positive ramp slope, the gain of the frequency response is decreased upon decrease of the positive ramp slope. As can be seen from the lower panel, in which the upper curve 630 (i.e. the upper curve for low frequencies) indicates the phase of the frequency response before decrease of the positive ramp slope and the lower curve 640 (i.e. the lower curve for low frequencies) indicates the phase of the frequency response after decrease of the positive ramp slope, the phase of the frequency response is decreased for frequencies below a frequency threshold (between $10^4$ Hz and $10^5$ Hz in the figure) and increased for frequencies above the frequency threshold, upon decrease of the positive ramp slope. Accordingly, the phase margin of the feedback loop is increased.

For a fourth method for modifying the at least one of the circuit parameters of the feedback circuit, it is assumed that the feedback circuit generates the control signal further on the basis of the seventh feedback quantity indicative of a difference between the current flowing through the switching element 20-2 of the one or more switching elements 20-1, 20-2 of FIG. 1, that is arranged closest to ground and the reference current (negative current threshold) for the current flowing through said switching element 20-2. According to the fourth method for modifying the at least one of the circuit parameters of the feedback circuit, the negative current threshold is increased. It is to be noted that the negative current threshold is another example of a circuit parameter of the feedback circuit.

Correspondingly, the means for modifying at least one of the circuit parameters of the feedback circuit of the control apparatus may comprise means for increasing the negative current threshold.

For a variation of the fourth method for modifying the at least one of the circuit parameters of the feedback circuit, it is assumed that the feedback circuit generates the control signal further on the basis of an eighth feedback quantity indicative of a difference between the current flowing through the switching element 20-1 of the one or more switching elements 20-1, 20-2 that is arranged closest to the input voltage and the reference current (positive current threshold) for the current flowing through said switching element 20-1. According to the variation of the fourth method for modifying the at least one of the circuit parameters of the feedback circuit, the positive current threshold is decreased. It is to be noted that the positive current threshold is another example of a circuit parameter of the feedback circuit.

Correspondingly, the means for modifying at least one of the circuit parameters of the feedback circuit of the control apparatus may comprise means for decreasing the positive current threshold.

Reducing the positive current threshold and increasing the negative current threshold contribute to a faster closing of the feedback loop after occurrence of the open loop condition. Said modification of current thresholds does not have an impact on the phase of the frequency response of the feedback loop, but results in a faster recovery of the feedback loop since the ringing amplitude of the inductor current is limited by said current thresholds.

According to a fifth method for modifying the at least one of the circuit parameters of the feedback circuit, a serial impedance and/or a parallel impedance of the feedback circuit are adjusted in such a manner that a transfer function (frequency response) of the feedback circuit after the adjustment has at least one additional pole and at least one additional zero. It is to be noted that the serial impedance and/or parallel impedance are further examples of a circuit parameter of the feedback circuit.

Correspondingly, the means for modifying at least one of the circuit parameters of the feedback circuit of the control apparatus may comprise means for adjusting the serial impedance and/or the parallel impedance of the feedback circuit in such a manner that a transfer function of the feedback circuit after the adjustment has at least one additional pole and at least one additional zero.

Figure 7:
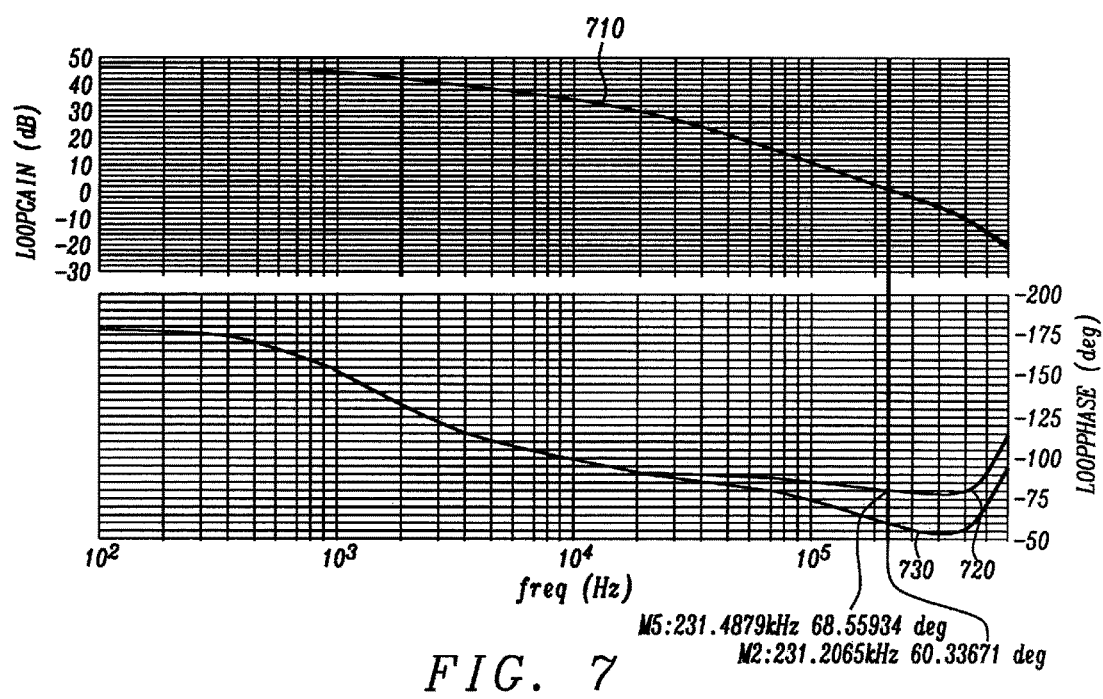
FIG. 7 shows a resulting frequency response of the feedback circuit of the power converter when applying embodiments of the invention.

FIG. 7 shows the resulting frequency response of the feedback circuit in case of adjusting the serial impedance and/or the parallel impedance of the feedback circuit. As can be seen from the upper panel, in which coinciding curves 710 indicates the gain of the frequency response before and after said adjusting, the gain of the frequency response is substantially unchanged by said adjusting. As can be seen from the lower panel in which the upper curve 720 indicates the phase of the frequency response after said adjusting and the lower curve 730 indicates the phase of the frequency response before said adjusting, the phase of the feedback loop is increased for frequencies above a frequency threshold (between $10^4$ Hz and $10^5$ Hz in the figure) and is substantially unchanged for frequencies below the frequency threshold, upon performing said adjusting. Accordingly, the phase margin of the feedback loop is increased.

Adding poles and/or zeros to the transfer function of the feedback circuit can be achieved by manipulating the serial impedance and/or the parallel impedance of the feedback circuit. The serial impedance may be represented by the first impedance element 42, and the parallel impedance may be represented by the second impedance element 44. For instance, assuming real values for the impedances, i.e. if $Z_1=R_1$ and $Z_2=R_2$ in normal operation of the power converter 1, a capacitor can be added in parallel to the first impedance element 42, e.g. by means of switches, to boost the phase of the frequency response at high frequencies. Further procedures for manipulating the impedance values of the first and second impedance elements 42, 44 are considered to be readily apparent to the expert.

It is understood that any of the above methods for modifying the at least one of the circuit parameters of the feedback circuit result in a faster closing of the feedback loop (i.e. faster recovery) after occurrence of the open loop condition that has been caused by a fast transient load.

As indicated above, the process of modifying the at least one of the circuit parameters of the feedback circuit may be performed immediately upon detection of the open loop condition, or with a time delay. For example, the process of modifying the at least one of the circuit parameters of the feedback circuit may be performed when a given feedback quantity, such as the first feedback quantity (feedback voltage) or the third feedback quantity (error voltage), for example, reaches its peak value after occurrence of the open loop condition. Said reaching of the peak value may be determined, for example, by detecting a change of the derivative of said given feedback quantity. FIG. 3 schematically illustrates a circuit diagram of a circuit 300 for determining a gradient of an input quantity, such as the output voltage of the power converter 1 or the error voltage, for example, and for determining an appropriate timing for modifying the at least one of the circuit parameters of the feedback circuit.

The circuit 300 comprises a derivator circuit 310, a comparator 320 (e.g. an operational amplifier), and a logic AND gate 330. The derivator circuit 310 comprises a comparator 316 (e.g. an operational amplifier), a capacitance element 312 (e.g. a capacitor), and a resistance element 314 (e.g. a resistor). An output port of the comparator 316 is connected to a first input port (e.g. the "−" (minus) port) of the comparator 316 via the resistance element 314. The first input port of the comparator 316 is further connected to the capacitance element 312, through which an input voltage, such as the output voltage or the error voltage, for example, may be fed to the first input port. A reference voltage, such as the reference voltage for the output voltage or a reference voltage for the error voltage, for example, may be fed to the second input port of the comparator 316 (e.g. the "+" (plus) port). The output port of the comparator 316 of the derivator circuit 310 is further connected to a first input port (e.g. the "+" port) of the comparator 320, so that an output of the comparator 316 is supplied to the first input port of the comparator 320. A threshold for the gradient of the input voltage may be supplied to the second port (e.g. the "−" port) of the comparator 320. An output port of the comparator 320 is connected to an input port of the logical AND gate 330, so that an output of the comparator 320 is supplied to said input port of the logical AND gate 330. A signal indicating whether or not an open loop condition is present is supplied to the other port of the logical AND gate 330. If an open loop condition is detected to be present, and if the derivative of the input voltage is found to be above the threshold, the logical AND gate 330 accordingly outputs a signal (such as a high level, for example) indicating the appropriate timing for modifying the at least one of the circuit parameters of the feedback circuit, i.e. indicating that said modifying may be commenced.

Modifying the at least one of the circuit parameters of the feedback circuit only after the given feedback quantity reaches its peak value after occurrence of the open loop condition has the following advantage. When the at least one of the circuit parameters of the feedback circuit is modified immediately upon detection of the open loop condition, there is a given risk to enhance the overshoot/undershoot of the output voltage and/or the inductor current, since in general the increase of the phase margin of the feedback loop (or the decrease of the positive current threshold or the increase of the negative current threshold), tends to make the overall system more stable, but also weaker.

Figure 8:
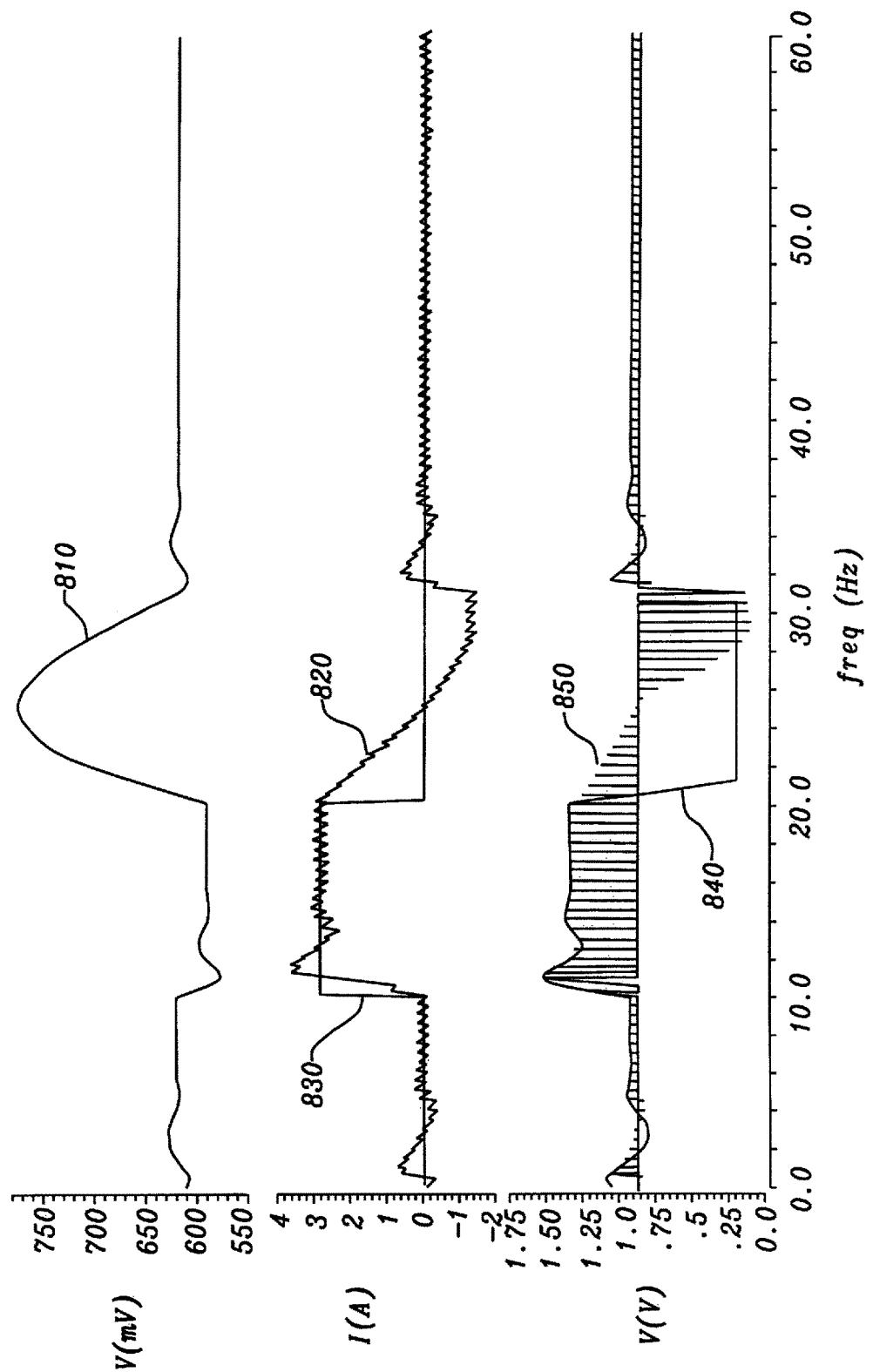
FIG. 8 shows a graph illustrating the output voltage and the coil current of the power converter in case of a removal of the load from the power converter when applying embodiments of the invention.

FIG. 8 shows a graph illustrating the output voltage and the coil current in case of a removal of the load from the power converter 1 when embodiments of the invention are applied to the power converter 1. Otherwise, FIG. 8 corresponds to FIG. 2. As can be seen from FIG. 8, at the time of removal of the load (approximately at 20 μs, see the lighter curve in the middle panel), the actual output voltage returns to a stable value substantially after a single oscillation. Further, the actual coil current crosses the error voltage briefly after the actual output voltage has reached its peak value. This is due to, among other measures, the boost of the current feedback and the reduction of the error amplifier gain. In summary, the power converter 1 returns to a stable condition (closed loop) much earlier than in the case illustrated in FIG. 2, so that ringing and resulting damage to the components of the power converter 1 may be avoided after a sudden removal of the load.

Figure 9:
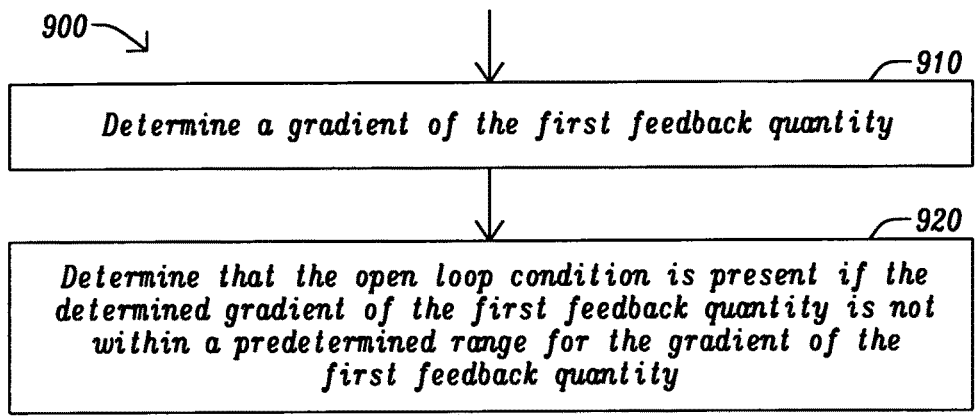
FIG. 9 shows a flowchart which uses a gradient to determine that an open loop condition is present.
Figure 10:
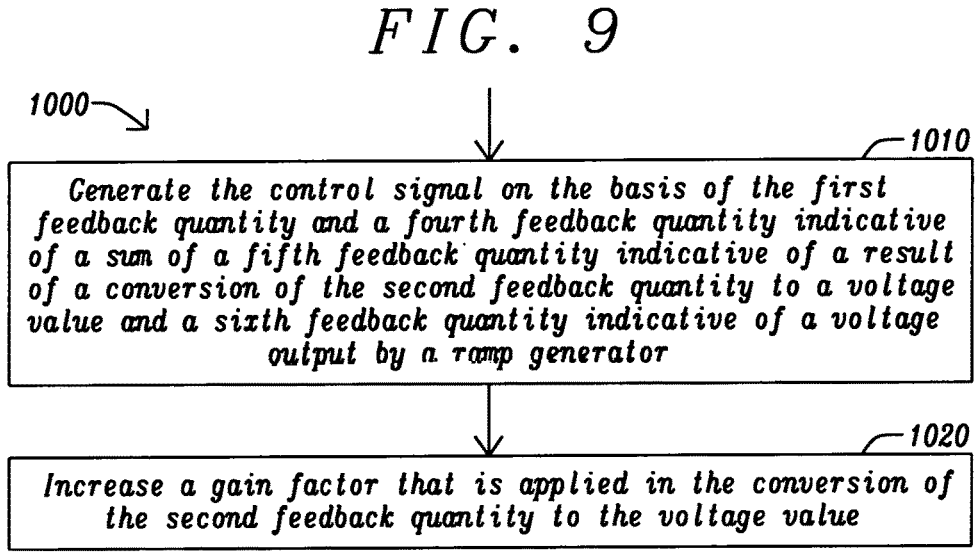
FIG. 10 shows a flowchart which generates a control signal and which increases a gain factor.
Figure 11:
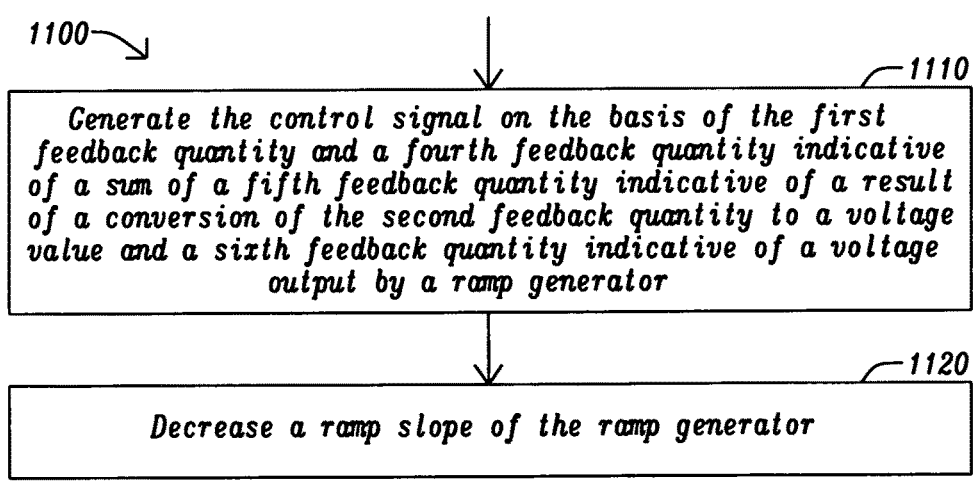
FIG. 11 shows a flowchart which generates a control signal and decreases a ramp slope.
Figure 12:
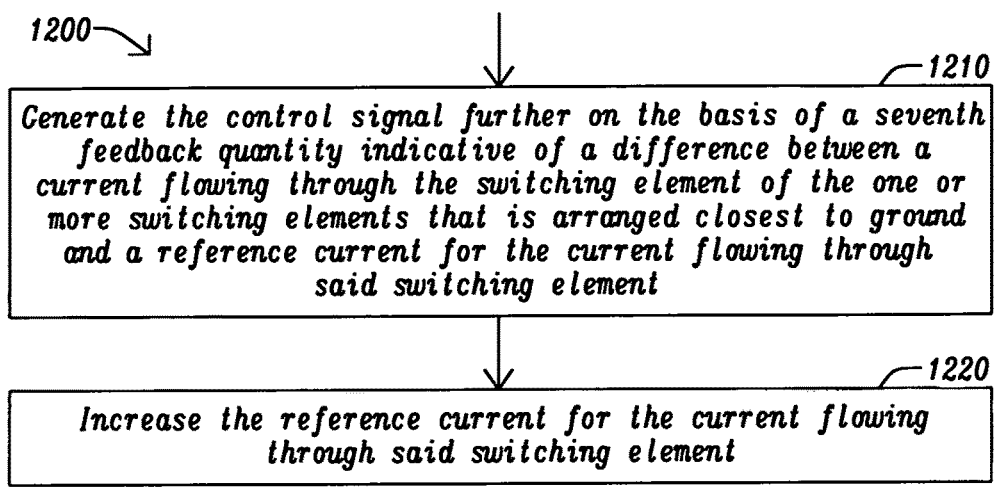
FIG. 12 shows a flowchart which generates a control signal and which increases the reference current.
Figure 13:
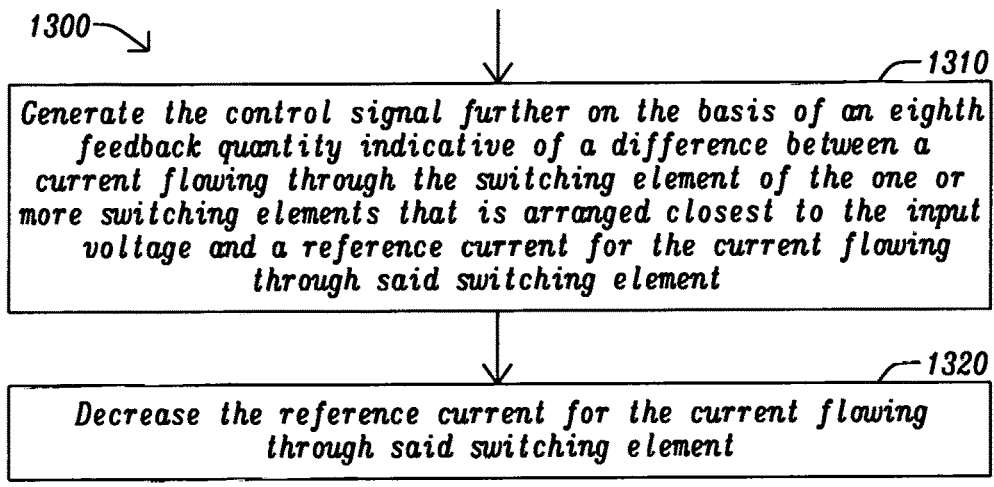
FIG. 13 shows a flowchart which generates a control signal and which decreases the reference current.
Figure 14:
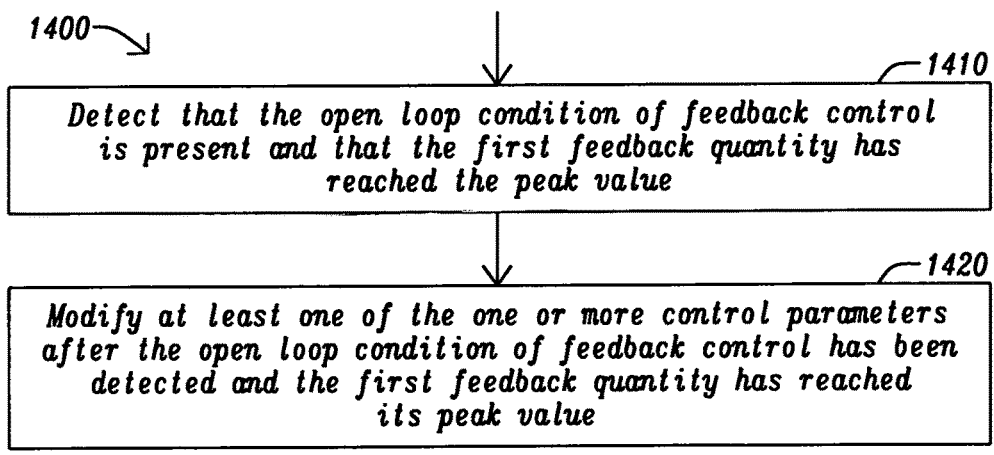
FIG. 14 shows a flowchart which detects an open loop feedback condition and that the feedback has reached peak value and which modifies control parameters.

FIG. 9 shows flowchart 900. The first step is to determine a gradient of the first feedback quantity 910. Next 920, there is the determination that the open loop condition is present if the gradient of the first feedback quantity is not within a predetermined range. FIG. 10 in flowchart 1000, begins 1010 with the generation of a control signal based on the first feedback quantity and a fourth feedback quantity. Then, in 1020, the flow calls for an increase in gain factor that for the conversion of the second feedback quantity to the voltage value. In FIG. 11, the flowchart 1100 begins with the generation 1110 of the control signal based on the first and fourth feedback quantities. Then, the flow calls for a decrease 1120 of the ramp slope from the ramp generator. FIG. 12 in flowchart 1200, begins 1210 with the generation of a control signal based on the seventh feedback quantity, indicative of a difference of current flowing through a switching element. Then, in 1220, the flow calls for an increase in the reference current flowing through the switching element. In FIG. 13, the flowchart 1300 begins with the generation 1310 of the control signal based on the eighth feedback quantity, indicative of a difference of current flowing through a switching element. Then, the flow calls for a decrease 1320 of the reference current flowing through the switching element. In FIG. 14, the flowchart 1400 begins with detecting 1410 if the open loop condition of feedback control is present and that the first feedback quantity has reached the peak value. Then, the flow calls for a modification 1420 of at least one of the control parameters.

It is to be understood that the control apparatus for/of the power converter 1 comprises appropriate means for executing the above method steps. These appropriate means may be implemented in software, hardware, and combinations thereof.

Features, components and specific details of the structures of the above-described embodiments may be exchanged or combined to form further embodiments optimized for the respective application. As far as those modifications are readily apparent for an expert skilled in the art, they shall be disclosed implicitly by the above description without specifying explicitly every possible combination, for the sake of conciseness of the present description.

What is claimed is:

1. A method of controlling a power converter for converting a DC input voltage to a DC output voltage, wherein the power converter comprises an inductor, one or more switching elements for energizing and de-energizing the inductor, a drive circuit for controlling switching operation of the one or more switching elements in accordance with a control signal, and a feedback circuit for generating the control signal on the basis of a first feedback quantity indicative of an actual output voltage of the power converter and in accordance with one or more circuit parameters of the feedback circuit, the method comprising:
   detecting an open loop condition of feedback control by the feedback circuit; and
   modifying at least one of the circuit parameters of the feedback circuit in such a manner that a time until the feedback control returns to the closed loop condition is reduced,
   wherein the feedback circuit generates the control signal on the basis of the first feedback quantity and a fourth feedback quantity indicative of a sum of a fifth feedback quantity indicative of a result of a conversion of a second feedback quantity indicative of an inductor current to a voltage value and a sixth feedback quantity indicative of a voltage output by a ramp generator; and
   modifying the at least one of the one or more circuit parameters involves:
   increasing a gain factor that is applied in the conversion of the second feedback quantity to the voltage value.

2. The method according to claim 1, wherein detecting the open loop condition involves:
   comparing the first feedback quantity to a first threshold value, and determining that the open loop condition is present if the first feedback quantity exceeds the first threshold value; and/or
   comparing the first feedback quantity to a second threshold value, and determining that the open loop condition is present if the first feedback quantity does not exceed the second threshold value.

3. The method according to claim 1, wherein detecting the open loop condition involves:
   determining a gradient of the first feedback quantity; and
   determining that the open loop condition is present if the determined gradient of the first feedback quantity is not within a predetermined range for the gradient of the first feedback quantity.

4. The method according to claim 1, wherein modifying at least one of the one or more control parameters involves:
   decreasing a ramp slope of the ramp generator.

5. The method according to claim 1, wherein modifying at least one of the one or more circuit parameters is performed after the open loop condition of feedback control has been detected and the first feedback quantity has reached its peak value.

6. A control apparatus within a power converter for converting a DC input voltage to a DC output voltage, wherein the power converter comprises an inductor, one or more switching elements for energizing and de-energizing the inductor, a drive circuit for controlling switching operation of the one or more switching elements in accordance with a control signal, and a feedback circuit for generating the control signal on the basis of a first feedback quantity indicative of an actual output voltage of the power converter and in accordance with one or more circuit parameters of the feedback circuit, wherein the control apparatus is configured to
   detect an open loop condition of feedback control by the feedback circuit; and wherein the control apparatus is configured to
   modify at least one of the circuit parameters of the feedback circuit in such a manner that a time until the feedback control by the feedback circuit returns to the closed loop condition is reduced,
   wherein the feedback circuit generates the control signal on the basis of the first feedback quantity and a fourth feedback quantity indicative of a sum of a fifth feedback quantity indicative of a result of a conversion of a second feedback quantity indicative of an inductor current to a voltage value and a sixth feedback quantity indicative of a voltage output by a ramp generator; and
   modifying the at least one of the one or more circuit parameters involves:
   increasing a gain factor that is applied in the conversion of the second feedback quantity to the voltage value.

7. The control apparatus according to claim 6, wherein the control apparatus is configured to detect the open loop condition
   by comparing the first feedback quantity to a threshold value to produce a compare result by determining that the open loop condition is present based on said compare result.

8. The control apparatus according to claim 6, wherein the control apparatus is configured to detect the open loop condition
   by determining a gradient of the first feedback quantity; and
   by determining that the open loop condition is present if the determined gradient of the first feedback quantity is not within a predetermined range for the gradient of the first feedback quantity.

9. The control apparatus according to claim 6, wherein the control apparatus is configured to
   modify the at least one of the one or more circuit parameters
   by decreasing a ramp slope of the ramp generator.

10. The control apparatus according to claim 6, wherein the control apparatus is configured to
    modify at least one of the one or more circuit parameters after the open loop condition of feedback control has been detected and the first feedback quantity has reached its peak value.

11. A power converter comprising the control apparatus according to claim 6.

12. A method of controlling a power converter for converting a DC input voltage to a DC output voltage, wherein the power converter comprises an inductor, one or more switching elements for energizing and de-energizing the inductor, a drive circuit for controlling switching operation of the one or more switching elements in accordance with a control signal, and a feedback circuit for generating the control signal on the basis of a first feedback quantity indicative of an actual output voltage of the power converter and in accordance with one or more circuit parameters of the feedback circuit, the method comprising:
- detecting an open loop condition of feedback control by the feedback circuit; and
- modifying at least one of the circuit parameters of the feedback circuit in such a manner that a time until the feedback control returns to the closed loop condition is reduced,
- wherein the feedback circuit generates the control signal further on the basis of a seventh feedback quantity indicative of a difference between a current flowing through the switching element of the one or more switching elements that is arranged closest to ground and a reference current for the current flowing through said switching element, and modifying the at least one of the one or more circuit parameters involves increasing the reference current for the current flowing through said switching element; and/or
- wherein the feedback circuit generates the control signal further on the basis of an eighth feedback quantity indicative of a difference between a current flowing through the switching element of the one or more switching elements that is arranged closest to the input voltage and a reference current for the current flowing through said switching element, and modifying the at least one of the one or more circuit parameters involves decreasing the reference current for the current flowing through said switching element.

13. The method according to claim 12, wherein detecting the open loop condition involves:
- comparing the first feedback quantity to a first threshold value, and determining that the open loop condition is present if the first feedback quantity exceeds the first threshold value; and/or
- comparing the first feedback quantity to a second threshold value, and determining that the open loop condition is present if the first feedback quantity does not exceed the second threshold value.

14. The method according to claim 12, wherein detecting the open loop condition involves:
- determining a gradient of the first feedback quantity; and
- determining that the open loop condition is present if the determined gradient of the first feedback quantity is not within a predetermined range for the gradient of the first feedback quantity.

15. The method according to claim 12, wherein
- modifying at least one of the one or more circuit parameters is performed after the open loop condition of feedback control has been detected and the first feedback quantity has reached its peak value.

16. A control apparatus within a power converter for converting a DC input voltage to a DC output voltage, wherein the power converter comprises an inductor, one or more switching elements for energizing and de-energizing the inductor, a drive circuit for controlling switching operation of the one or more switching elements in accordance with a control signal, and a feedback circuit for generating the control signal on the basis of a first feedback quantity indicative of an actual output voltage of the power converter and in accordance with one or more circuit parameters of the feedback circuit, wherein the control apparatus is configured to
- detect an open loop condition of feedback control by the feedback circuit; and wherein the control apparatus is configured to
- modify at least one of the circuit parameters of the feedback circuit in such a manner that a time until the feedback control by the feedback circuit returns to the closed loop condition is reduced,
- wherein the feedback circuit generates the control signal further on the basis of a seventh feedback quantity indicative of a difference between a current flowing through the switching element of the one or more switching elements that is arranged closest to ground and a reference current for the current flowing through said switching element, and wherein the control apparatus is configured to modify the at least one of the one or more circuit parameters by increasing the reference current for the current flowing through said switching element; and/or
- wherein the feedback circuit generates the control signal further on the basis of an eighth feedback quantity indicative of a difference between a current flowing through the switching element of the one or more switching elements that is arranged closest to the input voltage and a reference current for the current flowing through said switching element, and wherein the control apparatus is configured to modify at least one of the one or more circuit parameters by decreasing the reference current for the current flowing through said switching element.

17. The control apparatus according to claim 16, wherein the control apparatus is configured to detect the open loop condition
- by comparing the first feedback quantity to a threshold value to produce a compare result by determining that the open loop condition is present based on said compare result.

18. The control apparatus according to claim 16, wherein the control apparatus is configured to detect the open loop condition
- by determining a gradient of the first feedback quantity; and
- by determining that the open loop condition is present if the determined gradient of the first feedback quantity is not within a predetermined range for the gradient of the first feedback quantity.

19. The control apparatus according to claim 16, wherein the control apparatus is configured to
- modify at least one of the one or more circuit parameters after the open loop condition of feedback control has been detected and the first feedback quantity has reached its peak value.

20. A power converter comprising the control apparatus according to claim 16.

* * * * *